Sept. 13, 1966  L. MAUSKAPF  3,272,962
ELECTRIC ARC WORKING PROCESS
Filed May 3, 1965

*INVENTOR.*
LEONARD MAUSKAPF
BY Dominic J. Gemminello
*ATTORNEY*

United States Patent Office 3,272,962
Patented Sept. 13, 1966

3,272,962
ELECTRIC ARC WORKING PROCESS
Leonard Mauskapf, Wilkes-Barre, Pa., assignor to Union Carbide Corporation, a corporation of New York
Filed May 3, 1965, Ser. No. 452,697
3 Claims. (Cl. 219—137)

This application is a continuation-in-part of application Serial No. 183,871 filed March 30, 1962, now abandoned.

This invention relates to a process of electric arc welding wherein an arc is directed toward the material to be welded and more particularly to such a process wherein gas is introduced into the arc zone and the arc and at least some of the gas is passed through an arc constricting passage in a nozzle to produce a high energy density arc effluent. This process is freqeuntly referred to in the art as plasma-arc welding.

In this process, as in other electric welding processes, one of the first limitations on welding speed is the occurrence of undercutting. An undercut is defined by the American Welding Society in Welding Handbook, fifth edition, section one as "A groove melted into the base metal adjacent to the toe of a weld and left unfilled by weld metal." Since welding speed is one of the factors which determine the efficiency of the process, improvements in welding speeds without the occurrence of undercutting are always being sought.

It is, therefore, the main object of this invention to provide an electric arc welding process which greatly improves the speed and quality of welding.

Another object is to provide a plasma arc welding process wherein welding speed and quality are greatly improved.

In a general way, the objects of the invention are accomplished by directing gas along and outside of, but not surrounding, the arc plasma effluent. The reason for the remarkable and unexpected increase in the welding speed and improved quality of the weld obtained by practicing the method of the invention is not fully understood. However, it is postulated that the gas flow along and outside of but not surrounding the arc plasma effluent shapes the arc plasma to form an elongated arc plasma. The elongated arc keeps the hot weld metal molten until it flows out to the toe of the weld filling in what would otherwise be an undercut.

I have discovered that by providing, in the preferred embodiment, streams of gas on diametrically opposite sides of the arc plasma so that such streams of gas impinge on the workpiece on opposite sides of the line of weld so as to straddle the same, welding speeds have been greatly improved before the occurrence of undercutting.

For the purpose of this disclosure, the term "welding" is used to include weld surfacing, wherein elongation of the arc in a direction substantially perpendicular to the line of travel will be useful.

The preferred embodiment will be described hereinafter where reference will be made to the drawings wherein.

Figure 1:
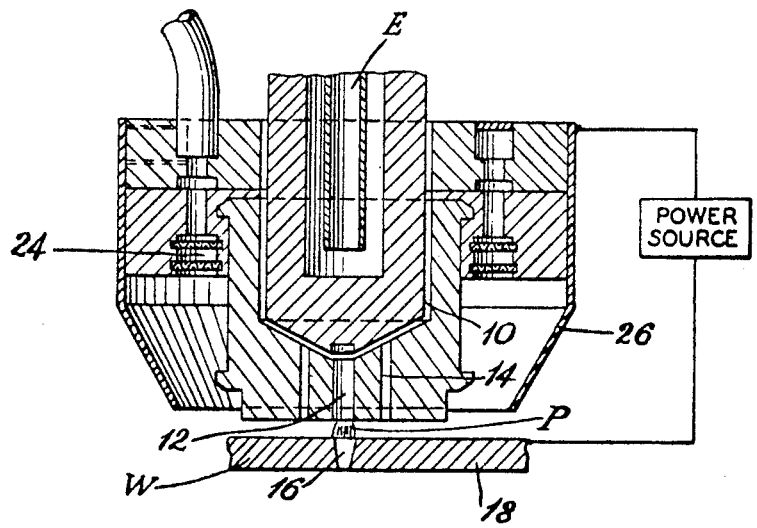
FIGURE 1 is a vertical section through a torch employed for carrying out the process according to the present invention.

Referring to FIGURE 1 an arc gas is passed down through the central bore of the torch into an arc chamber 10. The arc gas may be any gas suitable for the material being welded or the electrode being used. For example, gases such as helium, argon either alone or in combination with each other, or other gases such as hydrogen, $CO_2$, and $O_2$ have been used. An arc is struck from electrode E, preferably of tungsten, to the workpiece W. The arc passes together with at least some of the gas in the arc chamber through passage 12. Passage 12 constricts and stabilizes the arc and causes the arc plasma to operate upon the workpiece.

A part of the gas from the arc chamber 10 passes through arc shaping ports 14 which are spaced laterally from the passage 12 and are preferably in line therewith so as to elongate the arc plasma P in the direction of the weld. While it is preferred that the ports 14 be in line with passage 12, the important consideration is that the gas flowing out of ports 14 have a force vector that will act to elongate the plasma so that the ports 14 need not be in exact alignment in a direction perpendicular to the line of travel. Further while one port is shown on either side of the plasma P several ports may be provided in either side. The important consideration here is that the ports do not completely surround the plasma. If the ports completely surrounded the plasma, the forces exerted thereon would tend to eliminate the elongation effect which I believe to be desirable and necessary for successful practice of my invention. Still further while the ports 14 are shown to be longitudinally parallel to the passage 12, they may also be converging so as to focus on the plasma effluent. The gas supplied to ports 14 in my preferred embodiment is provided from the arc chamber 10. However, gas may be supplied to such ports from a separate source of gas which may be the same or different gas from that supplied to arc chamber 10.

Figure 2:
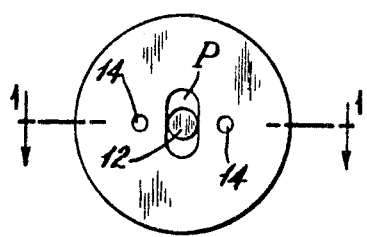
FIGURE 2 is a view from the workpiece showing the elongated plasma and nozzle.

The elongated plasma P (see FIGURE 2) in one mode of operation impinges on the work W and produces a keyhole effect when operating on material having a thickness of form about 0.090 to about 0.250 without a V or U groove joint preparation. Keyholing describes a technique of penetrating or piercing the workpiece with the arc plasma to produce a hole 16 through the work and then moving the hole produced by the arc effluent along the line of weld while allowing the molten metal to flow around the effluent and unite behind such effluent to form a weld with a smooth underbead. The shielding gas which may be the same or different from the gas in the arc chamber 10 is supplied to a chamber containing a gas lens 24 from which it passes inside an annular shroud 26 which discharges an annular shield of such gas outside of the effluent plasma from the passage 12 and the gas streams from the ports 14.

Figure 3:
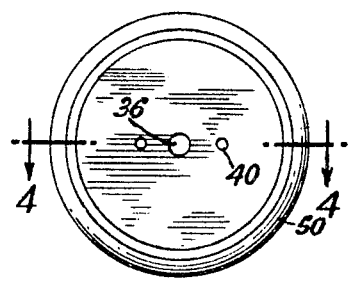
FIGURE 3 is a view looking from the bottom showing the hole arrangement in the nozzle.
Figure 4:
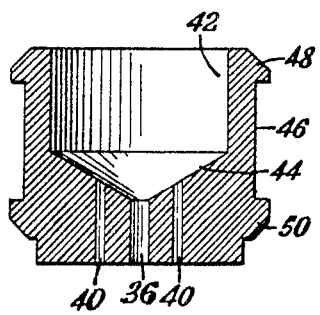
FIGURE 4 is a cross-sectional view of a nozzle shown in FIGURE 3.

The preferred nozzle configuration for practicing my invention is shown in FIGS. 3 and 4. Such nozzle comprises a cup having a central socket 42 within a cylindrical side wall and having a conical bottom 44 formed in the base. While a conical bottom is shown and preferred the bottom also may be U shaped so that the mouth of passageway 36 is substantially in alignment with the mouths of ports 40. The side walls have an annular groove 46 to form a water jacket between upper and lower flanges 48 and 50. The ports 40 are preferably on diametrically opposite sides of passage 36 and considerably smaller than the passage 36. It has been found that the throat of passage 36 preferably have a length over inside diameter ratio of one or less.

The utility of my invention is illustrated in the following examples:

A torch having a 3/32 inch dia. 2% thoriated tungsten electrode was utilized with a nozzle having .111 inch diameter center passage with .040 inch ports on either side of the center passage, the center to center distance between the side ports being .265 inch. The electrode was set back from the mouth of the center passage ⅛ inch. The workpiece was ⅛ inch thick 304 stainless steel which contains .08 max. carbon; 18–20 Cr; 8–10 Ni as designated by the American Iron and Steel Institute. The torch to work distance was 3/16 inch. The edges were square butt. Arc current was 170 ampere direct current straight polarity at 28½ volts. Gas flow through the nozzle was 10 c.f.h. of argon. Shielding gas was 30 c.f.h. argon. The welding speed was 19 i.p.m. without undercutting.

A comparison test was made under similar conditions without directing gas along and outside of the arc effluent. The apparatus was the same except the orifice of the single passage was .125 inch. Current was 180 amperes D.C.S.P. at 27 volts. Flow of argon through the single passage was 3 c.f.h. Shielding gas was argon at 30 c.f.h. The welding speed in this case was about 10 i.p.m. before undercutting occurred.

It will be noticed that by practicing my invention, an increase in welding speed of about 90% was realized.

While the above discussion is directed to a preferred embodiment, various modifications may be made to the invention as has been pointed out at various places in the specification and as will normally occur to one skilled in the art.

What is claimed is:

1. An electric arc welding process with an arc torch device including an electrode and a nozzle having a constricting arc passageway in substantial axial alignment with, but spaced from, said electrode to thereby provide a chamber between said electrode and the mouth of said arc passageway and having gas ports communicating with said chamber which comprises establishing an arc between said electrode and workpiece; introducing a gas into said arc torch and into said chamber, passing said arc and at least some of said gas through said constricting arc passageway to direct an arc plasma effluent upon said workpiece, directing the remainder of said gas through said gas ports in discrete streams on substantially diametrically opposite sides of said arc plasma along and outside of, but not surrounding, said arc plasma effluent to thereby elongate the arc plasma effluent.

2. An electric arc welding process according to claim 1 wherein said discrete streams are substantially parallel to said arc plasma.

3. An electric arc welding process with an arc torch device including an electrode and a nozzle having a constricting arc passageway in substantial axial alignment with, but spaced from, said electrode to thereby provide a chamber between said electrode and the mouth of said arc passageway and having gas ports communicating with said chamber which comprises establishing an arc between said electrode and workpiece; introducing a gas into said arc torch and into said chamber; passing said arc and at least some of said gas through said constricting arc passageway to direct an arc plasma effluent upon said workpiece; directing the remainder of said gas through said gas ports in two discrete streams such streams being on substantially diametrically opposed sides of said arc plasma along and outside of but not surrounding said arc plasma effluent to thereby elongate the arc plasma effluent.

References Cited by the Examiner
UNITED STATES PATENTS

| | | | |
|---|---|---|---|
| 1,638,336 | 8/1927 | Himes | 219—121 |
| 2,726,309 | 12/1955 | Stephath | 219—70 |
| 2,806,124 | 9/1957 | Gage | 219—75 X |
| 2,905,805 | 9/1959 | McElrath et al. | 219—137 |
| 3,148,263 | 9/1964 | Jensen | 219—75 |

References Cited by the Applicant
FOREIGN PATENTS

36/20,706 2/1961 Japan.

RICHARD M. WOOD, *Primary Examiner.*

JOSEPH V. TRUHE, *Examiner.*